United States Patent
Li et al.

(10) Patent No.: US 11,019,624 B2
(45) Date of Patent: May 25, 2021

(54) LICENSED BAND FALLBACK FOR WIRELESS DEVICES THAT OPERATE IN UNLICENSED BANDS

(71) Applicant: QUALCOMM Incorporated, San Diego, CA (US)

(72) Inventors: Chong Li, Weehawken, NJ (US); Karl Georg Hampel, Hoboken, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/137,152

(22) Filed: Sep. 20, 2018

(65) Prior Publication Data

US 2019/0110293 A1    Apr. 11, 2019

Related U.S. Application Data

(60) Provisional application No. 62/571,136, filed on Oct. 11, 2017.

(51) Int. Cl.
*H04W 72/04* (2009.01)
*H04W 36/14* (2009.01)
(Continued)

(52) U.S. Cl.
CPC ....... *H04W 72/0453* (2013.01); *H04W 16/14* (2013.01); *H04W 28/0205* (2013.01);
(Continued)

(58) Field of Classification Search
CPC ......... H04W 72/0453; H04W 72/1252; H04W 72/08–72/087; H04W 72/1226–1236;
(Continued)

(56) References Cited

U.S. PATENT DOCUMENTS 10,070,321 B2 *  9/2018  Li ....................... H04W 72/085
2012/0320741 A1 * 12/2012  Freda ................... H04W 16/14
                                                                  370/229
(Continued)

FOREIGN PATENT DOCUMENTS

EP      2408234 A1     1/2012
WO   2017091478 A1     6/2017

OTHER PUBLICATIONS

Huawei, et al., "NR Numerology on Unlicensed Bands," 3GPP Draft; R1-1717912, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 8, 2017, XP051341096, 6 pages, Retrieved from the Internet: URL: http://www.3gpp.org/ftp/Meetings_3GPP_SYNC/RAN1/Docs/ [retrieved on Oct. 8, 2017].

(Continued)

*Primary Examiner* — Joshua Kading
(74) *Attorney, Agent, or Firm* — Qualcomm Incorporated

(57) ABSTRACT

Aspects of the present disclosure describe a fallback silencing mechanism for wireless communications. A wireless device that operates primarily on unlicensed frequency bands, such as a factory automation device, may occasionally have a need to make Ultra-Reliable Low-Latency Communication (URLLC) transmissions. If the unlicensed band becomes unsuitable for URLLC transmissions, the wireless device may fallback to licensed band transmissions. A silencing signal may be sent on downlink resources to silence uplink Enhanced Mobile Broadband (eMBB) transmissions for one or more mini-slots. The wireless device may then send a URLLC transmission on the one or more min-slots.

24 Claims, 10 Drawing Sheets

(51) Int. Cl.
| | |
|---|---|
| *H04W 36/30* | (2009.01) |
| *H04W 74/08* | (2009.01) |
| *H04W 16/14* | (2009.01) |
| *H04W 28/02* | (2009.01) |
| *H04W 28/08* | (2009.01) |
| *H04W 36/22* | (2009.01) |
| *H04W 48/06* | (2009.01) |
| *H04W 72/12* | (2009.01) |
| *H04W 72/08* | (2009.01) |
| *H04W 48/18* | (2009.01) |
| *H04W 36/00* | (2009.01) |
| *H04W 76/14* | (2018.01) |
| *H04W 76/20* | (2018.01) |

(52) U.S. Cl.
CPC ... *H04W 28/0231* (2013.01); *H04W 28/0252* (2013.01); *H04W 28/0284* (2013.01); *H04W 28/085* (2013.01); *H04W 36/03* (2018.08); *H04W 36/14* (2013.01); *H04W 36/22* (2013.01); *H04W 36/30* (2013.01); *H04W 48/06* (2013.01); *H04W 48/18* (2013.01); *H04W 72/0406* (2013.01); *H04W 72/08* (2013.01); *H04W 72/1226* (2013.01); *H04W 72/1252* (2013.01); *H04W 74/0808* (2013.01); *H04W 76/14* (2018.02); *H04W 76/20* (2018.02)

(58) Field of Classification Search
CPC . H04W 72/0406; H04W 48/18; H04W 48/06; H04W 74/0808; H04W 28/0205; H04W 28/0284; H04W 28/0252; H04W 28/085; H04W 28/0231; H04W 28/0236; H04W 28/0263; H04W 28/08; H04W 36/03; H04W 36/30; H04W 36/22; H04W 36/14; H04W 36/16–20; H04W 36/305; H04W 16/14; H04W 16/16; H04W 76/14; H04W 76/20
See application file for complete search history.

(56) References Cited

U.S. PATENT DOCUMENTS

| | | | |
|---|---|---|---|
| 2016/0374039 A1* | 12/2016 | Khoryaev | H04W 56/0015 |
| 2017/0208477 A1* | 7/2017 | Hampel | H04L 5/0007 |
| 2018/0176953 A1* | 6/2018 | Hampel | H04W 74/0808 |
| 2019/0150056 A1* | 5/2019 | Xu | H04W 40/22 370/328 |
| 2019/0174440 A1* | 6/2019 | Kwak | H04W 52/0216 |

OTHER PUBLICATIONS

International Search Report and Written Opinion—PCT/US2018/052201—ISA/EPO—dated Dec. 21, 2018.

* cited by examiner

LICENSED BAND FALLBACK FOR WIRELESS DEVICES THAT OPERATE IN UNLICENSED BANDS

This application claims the benefit of U.S. Provisional Application Ser. No. 62/571,136, entitled "LICENSED BAND FALLBACK FOR WIRELESS DEVICES THAT OPERATE IN UNLICENSED BANDS" and filed on Oct. 11, 2017 which is expressly incorporated by reference herein in its entirety.

BACKGROUND

Aspects of the present disclosure relate generally to wireless communication systems, and more particularly, to wireless communication systems that require a high reliability low latency capability.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. 5G communications technology may include enhanced mobile broadband (eMBB) addressing human-centric use cases for access to multimedia content, services and data; ultra-reliable-low latency communications (URLLC) with certain requirements for latency and reliability; and massive machine type communications, which can allow a very large number of connected devices and transmission of a relatively low volume of information. As the demand for mobile broadband access continues to increase, however, further improvements in 5G communications technology and beyond may be desired.

Many wireless devices, such as factory automation (FA) devices, operate primarily in the unlicensed band. They may communicate using Bluetooth, Wi-Fi or other unlicensed band protocols. These devices may have a need to occasionally transmit data very reliably and with low latency. Unlicensed bands, however, are vulnerable to overuse, interference and other problems that may make unlicensed channels unsuitable for highly reliable and/or low latency communications. Accordingly, there is a need for methods and apparatuses that allow these wireless devices to have a more robust URLLC capability.

SUMMARY

The following presents a simplified summary of one or more aspects to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a User Equipment may transmit to a second UE on a channel in an unlicensed band and determine that the channel is not suitable for transmitting a URRLC message, the UE may then transmit a silencing signal on a downlink resource of a gNB. The silencing signal may be, for example, a request for another UE to suspend transmitting on one or more subsequent eMBB mini-slots. The UE may then transmit directly to the second UE on the one or more subsequent eMBB mini-slots.

In another aspect, a second UE may receive a silencing signal on a downlink resource of a gNB. The silencing signal may be received from a first UE or from a gNB. In response to receiving the silencing signal, the UE may suspend uplink eMBB transmission for one or more mini-slots enabling the UE to receive URLLC signals directly from the first UE.

In a further aspect, a first UE may transmit to a second UE on a channel in an unlicensed band and determine that the channel is not suitable for transmitting a URRLC message. The first UE may then transmit a request to a gNB to transmit a silencing signal. The gNB may in turn transmit the silencing signal. The silencing signal may indicate to the second UE that it should suspend transmitting on one or more subsequent mini-slots. The first UE then may transmit directly to the second UE on the one or more subsequent mini-slots.

In yet another aspect, a gNB may receive from a UE a request to send a silencing signal and the gNB may transmit the silencing signal on a downlink resource. The silencing signal may be a request to cease eMBB uplink transmissions on one or more subsequent resources. The gNB may also send information, within or external to the silencing signal, about a silencing duration or information about which specific resources eMBB uplink transmissions should cease.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
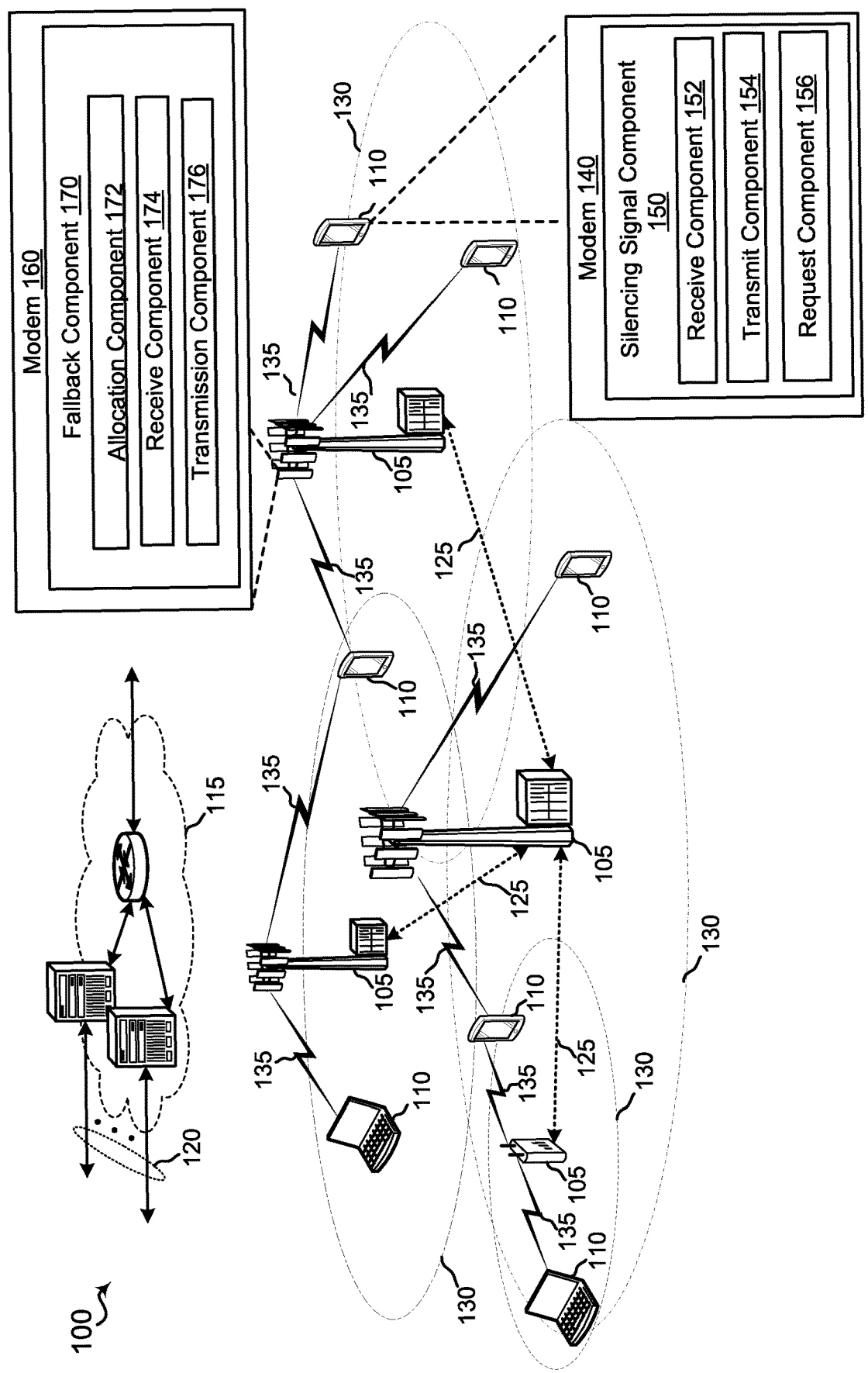
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Flexible and dynamic assignment of resources may be a hallmark of 5G New Radio (NR). Dynamic assignment of resources for URLCC and eMBB may be essential features. For example, a 5G gNB may puncture eMBB downlink resources occasionally with URLCC data traffic. An indicator may be used to indicate that the gNB has punctured resources, allowing a UE receiving the eMBB data traffic to identify the punctured resources. By identifying the punctured resources, the UE may discard traffic received over the punctured resources before decoding, resulting in better block error ratios (BLER). The indicator is also of use to a UE receiving URLCC traffic, allowing it to identify data traffic that is not associated with the indicator. The URLCC receiving UE may thus skip decoding eMBB traffic, saving power. The downlink indicator may be explicit, implicit or both. For example, the indicator may be sent on a Physical Downlink Control Channel (PDCCH) and explicitly identify the punctured resources. The indicator may also be implied, for example, by phase shifting a synchronous reference signal when eMBB resources are punctured with URLLC data.

Many devices in use today communicate with each other using a Wireless Sensor Network (WSN). WSNs are used, for example, in factory settings to automate and coordinate the activities of sensors, controllers and other devices. Inexpensive wireless connections facilitate automation of the functions in a factory. Occasionally, some of these devices have a need to send Mission Critical (MiCr) data in a highly reliable and low latency manner. Some factory functions and devices, may even have a need to send messages that require very low Bit Error Rates (BER) often as low as $10^{-9}$ with very low latencies often as low as 2 mS.

Most conventional FA devices operating in a WSN use unlicensed spectrum because it's inexpensive and there are many off the shelf solutions that provide inexpensive data communication capability. Bluetooth and WiFi, for example, are standardized solutions for operating in the unlicensed spectrum and many FA devices use these and other suitable protocols for efficient and inexpensive communication in unlicensed bands.

Exclusive use of unlicensed spectrum for the WSNs and FA devices, however, imposes a real reliability and latency cost. Devices operating in unlicensed spectrum are vulnerable to unwanted interference and a variety of problems such as spectral overuse, noise, microwave interference, etc. Unlicensed band interference may be tolerable for ordinary communications but the problems noted above may occasionally make unlicensed channels unsuitable for URLLC communications. Accordingly, it may be beneficial for FA devices to use unlicensed band communication channels for most of their communications and fallback to licensed communication channels when the channel used for unlicensed communication becomes unsuitable. A channel might be considered unsuitable when: the FA device ascertains that it is unable to transmit data to another device with a predetermined required reliability and/or latency; a Clear Channel Assessment (CCA) fails; a previous message is not received or acknowledged; or according to other channel quality criteria. That way, the FA device uses the inexpensive unlicensed spectrum in bulk and fallbacks to the generally more expensive licensed spectrum as needed.

To facilitate a licensed spectrum fallback capability, a gNB may reserve one or more dedicated downlink resources in one or more mini-slots. The one or more downlink resources may be, for example, a dedicated resource in a URLLC/eMBBB downlink multiplexing indication channel. The one or more reserved downlink resources may be used to send a silencing signal. A UE operating in the WSN on an unlicensed channel may then fallback to the licensed spectrum by effecting a silencing transmission in the one or more downlink resources. UEs receiving the silencing transmission would suspend their eMBBB uplink transmissions in one or more subsequent mini-slots, allowing the UE operating in the WSN to transmit a URLLC transmission directly to another UE in the one or more subsequent mini-slots.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring to FIG. 1, in accordance with various aspects of the present disclosure an example wireless communication network 100 includes at least one UE 110 with a modem 140 having a silencing signal component 150 that determines whether the UE 110 has received or should transmit a silencing signal on a downlink resource indicating that uplink eMBB transmissions should cease on one or more mini-slots so that a URLLC transmission may be sent on those mini-slots. The silencing signal component 150 may include a receive component 152 for receiving the silencing signal on a downlink resource, a transmit component 154 for transmitting the silencing signal on a downlink resource, and a request component for requesting that a base station (gNB) 105 transmit a silencing signal on a downlink resource. Further wireless communication network 100 includes at least one base station 105 with a modem 160 having a fallback component 170 that provides a fallback option for UE 110 to transmit URLLC data on one or more mini-slots. The fallback component 170 may include an allocation component 172 for allocating one or more downlink resources for sending a silencing signal, a receive component 174 for receiving a request for a silencing signal and a transmission component 176 for transmitting the silencing signal and information about the downlink silencing resource and the resources in the one or more mini-slots affected by the silencing signal. Thus, according to the present disclosure UE 110 may fallback to making URLLC transmissions on eMBB uplink resources on or more mini-slots.

The wireless communication network 100 may include one or more base stations 105 one or more UEs 110 and a core network 115. The core network 115 may provide user authentication access authorization tracking internet protocol (IP) connectivity and other access routing or mobility functions. The base stations 105 may interface with the core network 115 through backhaul links 120 (e.g. S1 etc.). The base stations 105 may perform radio configuration and scheduling for communication with the UEs 110 or may operate under the control of a base station controller (not shown). In various examples, the base stations 105 may communicate either directly or indirectly (e.g. through core network 115) with one another over backhaul links 125 (e.g. X1 etc.) which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station a radio base station an access point an access node a radio transceiver a NodeB, eNodeB (eNB), gNB, Home NodeB, a Home eNodeB, a relay or some other suitable terminology. The geographic coverage area 130 for a base station 105 may be divided into sectors or cells making up only a portion of the coverage area (not shown). The wireless communication network 100 may include base stations 105 of different types (e.g. macro base stations or small cell base stations described below). Additionally, the plurality of base stations 105 may operate according to different technologies (e.g. 5G (New Radio or "NR") fourth generation (4G)/LTE 3G Wi-Fi Bluetooth etc.) and thus there may be overlapping geographic coverage areas 130 for different communication technologies.

In some examples the wireless communication network 100 may be or include one or any combination of communication technologies including a NR or 5G technology a Long Term Evolution (LTE) or LTE-Advanced (LTE-A) or MuLTEfire technology a Wi-Fi technology a Bluetooth technology or any other long or short range wireless communication technology. In LTE/LTE-A/MuLTEfire networks the term evolved node B (eNB) may be generally used to describe the base stations 105 while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell a small cell or other types of cell. The term "cell" is a 3GPP term that can be used to describe a base station a carrier or component carrier associated with a base station or a coverage area (e.g. sector etc.) of a carrier or base station depending on context.

A macro cell may generally cover a relatively large geographic area (e.g. several kilometers in radius) and may allow unrestricted access by UEs 110 with service subscriptions with the network provider.

A small cell may include a relatively lower transmit-powered base station as compared with a macro cell that may operate in the same or different frequency bands (e.g.

licensed unlicensed etc.) as macro cells. Small cells may include pico cells, femto cells and micro cells according to various examples. A pico cell, for example, may cover a small geographic area and may allow unrestricted access by UEs 110 with service subscriptions with the network provider. A femto cell may also cover a small geographic area (e.g. a home) and may provide restricted access and/or unrestricted access by UEs 110 having an association with the femto cell (e.g. in the restricted access case UEs 110 in a closed subscriber group (CSG) of the base station 105 which may include UEs 110 for users in the home and the like). An eNB for a macro cell may be referred to as a macro eNB. An eNB for a small cell may be referred to as a small cell eNB a pico eNB a femto eNB or a home eNB. An eNB may support one or multiple (e.g. two three four and the like) cells (e.g. component carriers).

The communication networks that may accommodate some of the various disclosed examples may be packet-based networks that operate according to a layered protocol stack and data in the user plane may be based on the IP. A user plane protocol stack (e.g. packet data convergence protocol (PDCP) radio link control (RLC) MAC etc.) may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency.

In the control plane, the RRC protocol layer may provide establishment configuration and maintenance of an RRC connection between a UE 110 and the base stations 105. The RRC protocol layer may also be used for core network 115 support of radio bearers for the user plane data. At the physical (PHY) layer the transport channels may be mapped to physical channels. The UEs 110 may be dispersed throughout the wireless communication network 100 and each UE 110 may be stationary or mobile.

A UE 110 may also include or be referred to by those skilled in the art as a mobile station a subscriber station a mobile unit a subscriber unit a wireless unit a remote unit a mobile device a wireless device a wireless communications device a remote device a mobile subscriber station an access terminal a mobile terminal a wireless terminal a remote terminal a handset a user agent a mobile client a client or some other suitable terminology. A UE 110 may be a cellular phone a smart phone a personal digital assistant (PDA) a wireless modem a wireless communication device a handheld device a tablet computer a laptop computer a cordless phone a smart watch a wireless local loop (WLL) station an entertainment device a vehicular component a customer premises equipment (CPE) or any device capable of communicating in wireless communication network 100.

Additionally, a UE 110 may be Internet of Things (IoT) and/or machine-to-machine (M2M) type of device e.g. a low power low data rate (relative to a wireless phone for example) type of device that may in some aspects communicate infrequently with wireless communication network 100 or other UEs. A UE 110 may be able to communicate with various types of base stations 105 and network equipment including macro eNBs small cell eNBs macro gNBs small cell gNBs relay base stations and the like.

UE 110 may be configured to establish one or more wireless communication links 135 with one or more base stations 105. The wireless communication links 135 shown in the wireless communication network 100 may carry uplink (UL) transmissions from a UE 110 to a base station 105 or downlink (DL) transmissions from a base station 105 to a UE 110. The downlink transmissions may also be called forward link transmissions while the uplink transmissions may also be called reverse link transmissions. Each wireless communication link 135 may include one or more carriers where each carrier may be a signal made up of multiple sub-carriers (e.g. waveform signals of different frequencies) modulated according to the various radio technologies described above. Each modulated signal may be sent on a different sub-carrier and may carry control information (e.g. reference signals control channels etc.) overhead information user data etc. In an aspect the wireless communication links 135 may transmit bidirectional communications using frequency division duplex (FDD) (e.g. using paired spectrum resources) or time division duplex (TDD) operation (e.g. using unpaired spectrum resources). Frame structures may be defined for FDD (e.g. frame structure type 1) and TDD (e.g. frame structure type 2). Moreover in some aspects the wireless communication links 135 may represent one or more broadcast channels.

In some aspects of the wireless communication network 100 base stations 105 or UEs 110 may include multiple antennas for employing antenna diversity schemes to improve communication quality and reliability between base stations 105 and UEs 110. Additionally, or alternatively base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers a feature which may be referred to as carrier aggregation (CA) or multi-carrier operation. A carrier may also be referred to as a component carrier (CC) a layer a channel etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g. Y=5 10 15 or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g. more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communication network 100 may further include base stations 105 operating according to Wi-Fi technology e.g. Wi-Fi access points in communication with UEs 110 operating according to Wi-Fi technology e.g. Wi-Fi stations (STAs) via communication links in an unlicensed frequency spectrum (e.g. 5 GHz). When communicating in an unlicensed frequency spectrum the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz and may also be referred to as centimeter wave. Communications using the mmW and/or near mmW radio frequency band has extremely high path loss and a short range. As such base stations 105 and/or UEs 110 operating according to the mmW technology may utilize beamforming in their transmissions to compensate for the extremely high path loss and short range.

Figure 2:
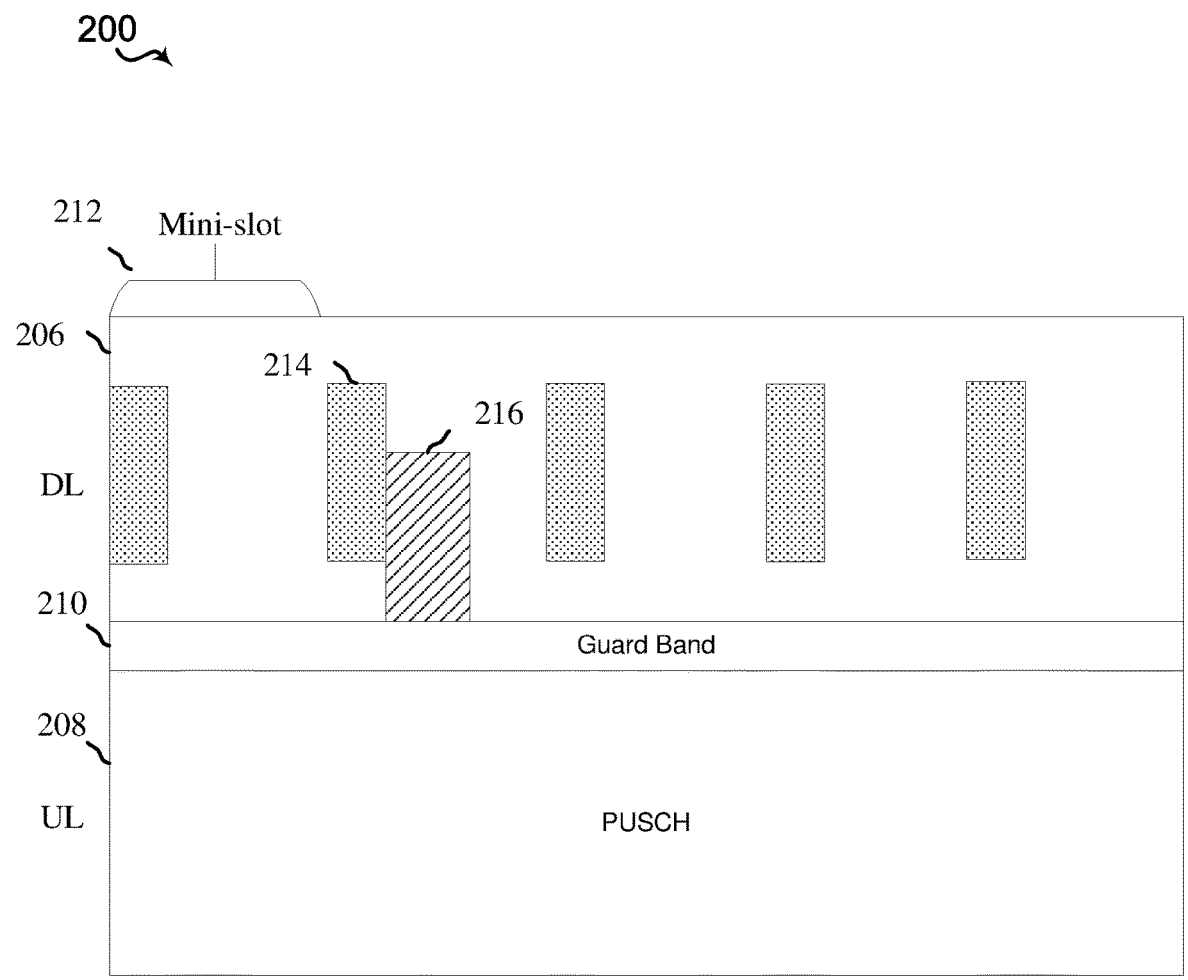
FIG. 2 illustrates an example of URLLC puncturing eMBB traffic on the downlink, in accordance with various aspects of the present disclosure.

Referring to FIG. 2, in accordance with various aspects of the present disclosure, an example of URLLC puncturing eMBB traffic on the downlink is shown. The timeline is shown with the vertical axis 202 representing frequency and the horizontal axis 204 representing time. Downlink resources 206 and uplink resources 208 are separated in frequency by a guard band 210. The downlink resources 206 and uplink resources 208 can be temporally divided into mini-slots 212. A Physical Uplink Shared Channel (PUSCH) is available on the uplink resources 208 and Physical Layer Downlink Control Channel (PDDCH) 214 is available on mini-slots 212 of the downlink resources 206.

The downlink resources 206 may have eMBB traffic scheduled when URRLC data needs to be sent. To send the URRLC data, the gNB may indicate in PDCCH 214 that eMBB traffic is punctured on certain resources. The gNB can then puncture those resources with URLCC data 216. UEs receiving eMBB data may discard the eMBB resources punctured with URLCC data 216, allowing for improved decoding performance and BLER. UEs receiving URLCC data 216 will know a priori the resources that are punctured, allowing them to only decode the punctured resources, saving power.

In other aspects, the gNB will indicate the punctured resources in other downlink messages or implicitly. For example, the gNB may vary the phase of a reference signal to indicate which eMBB resources will be punctured. Not sending any indication of which resources are to be punctured is also contemplated. In this aspect, overhead may be saved at the expense of decoding complexity.

Figure 3:
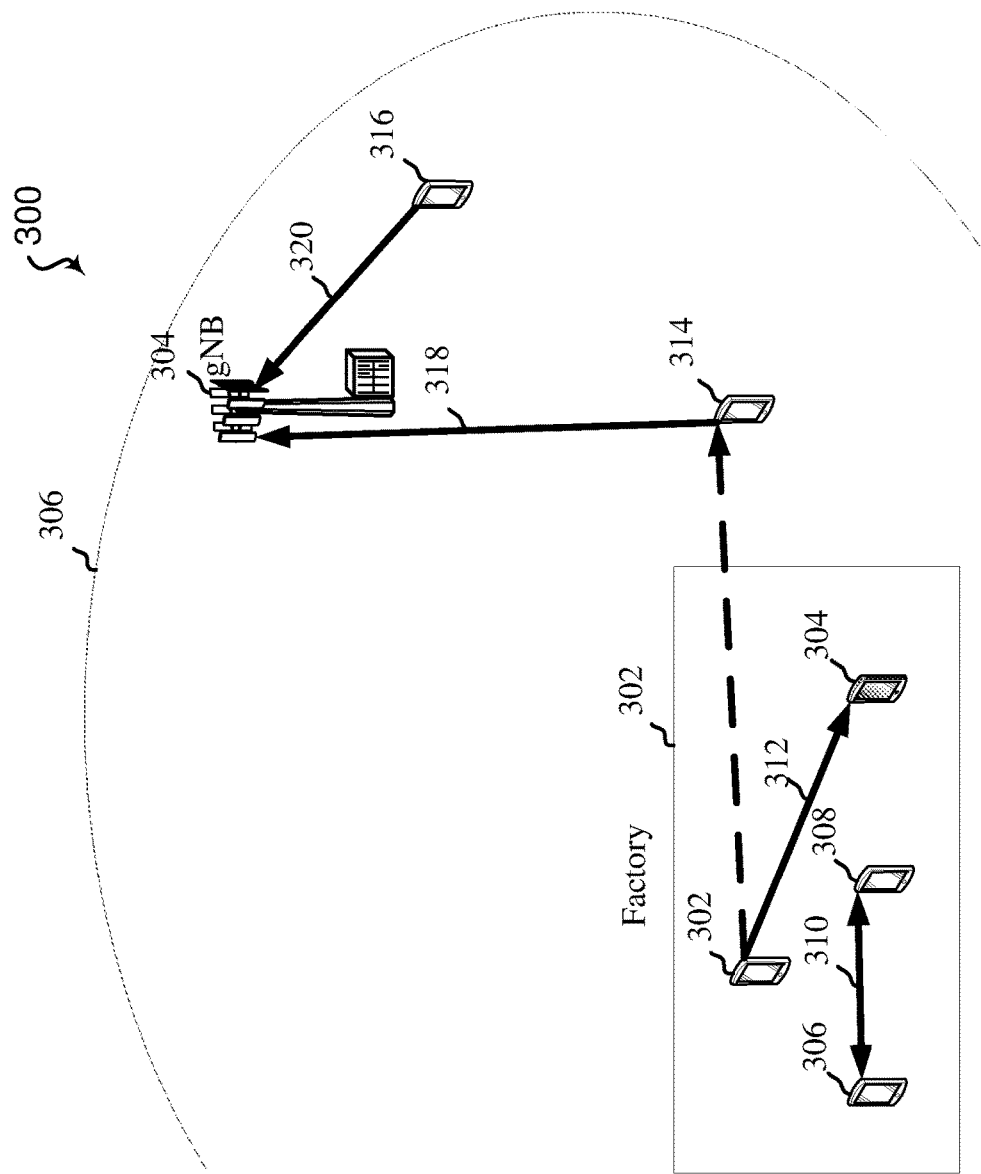
FIG. 3 illustrates an example of a UE sending a silencing signal, in accordance with various aspects of the present disclosure.

Referring to FIG. 3, in accordance with various aspects of the present disclosure an example of a UE sending a silencing signal is shown 300. A factory 302 inside gNB 304 cell coverage 306 is shown. Inside the factory are factory automation devices that communicate using UEs 302, 304, 306, and 308. UE 302 is in communication with UE 304 over link 310 and UE 306 is in communication with UE 308 over link 312. Outside the factory there are two UEs, UE 314 and 316 in communication with gNB 304 having uplinks 318, and 320 respectively.

The preferred communication protocol between UEs 302, 304, 306, and 308 in factory 302 is an unlicensed protocol, for example, Bluetooth or Wifi. For example, link 310 may be a Bluetooth link and link 312 may be a Wifi link. Unlicensed band communications are relatively inexpensive since the spectrum is not proprietary and inexpensive off the shelf technology is readily available. Unlicensed bands, however, are vulnerable to overuse, interference and other problems that may make unlicensed channels unsuitable for highly reliable and/or low latency communications.

UE 302 may be associated with a factory controller and UE 304 may be associated with a factory sensor, for example. The controller associated with UE 302 may have a need to send a URLLC message to factory sensor associated with UE 304 over link 312. UE 302 may, for example, have a failed CCA or have failed to receive an acknowledgement for a previously sent message. At this point, the UE 302 may fall back to using the licensed band by transmitting a silencing signal on a dedicated downlink resource of gNB 304. The silencing signal may be heard by UEs in proximity to UE 302, such as UE 314. This would signal to UE 314 that it should suspend eMBB transmissions on uplink 318 for one or more mini-slots. UE 302 could then use the newly freed-up resources to transmit a URLLC message directly to UE 304 on the licensed band. UE 316 not in proximity to UE 302 would not hear the silencing signal and could continue to transmit eMBB messages on uplink 320.

It can be appreciated, that UE 302 may continue to send the silencing signal as long as an unlicensed channel is unsuitable or unavailable. The UE 302 may also actively monitor the unlicensed band while sending messages on the licensed band. It can also be appreciated that use of the licensed band may not be limited to URLCC messages but may be used as needed. Of course, there may be greater cost associated with using the licensed band.

Figure 4:
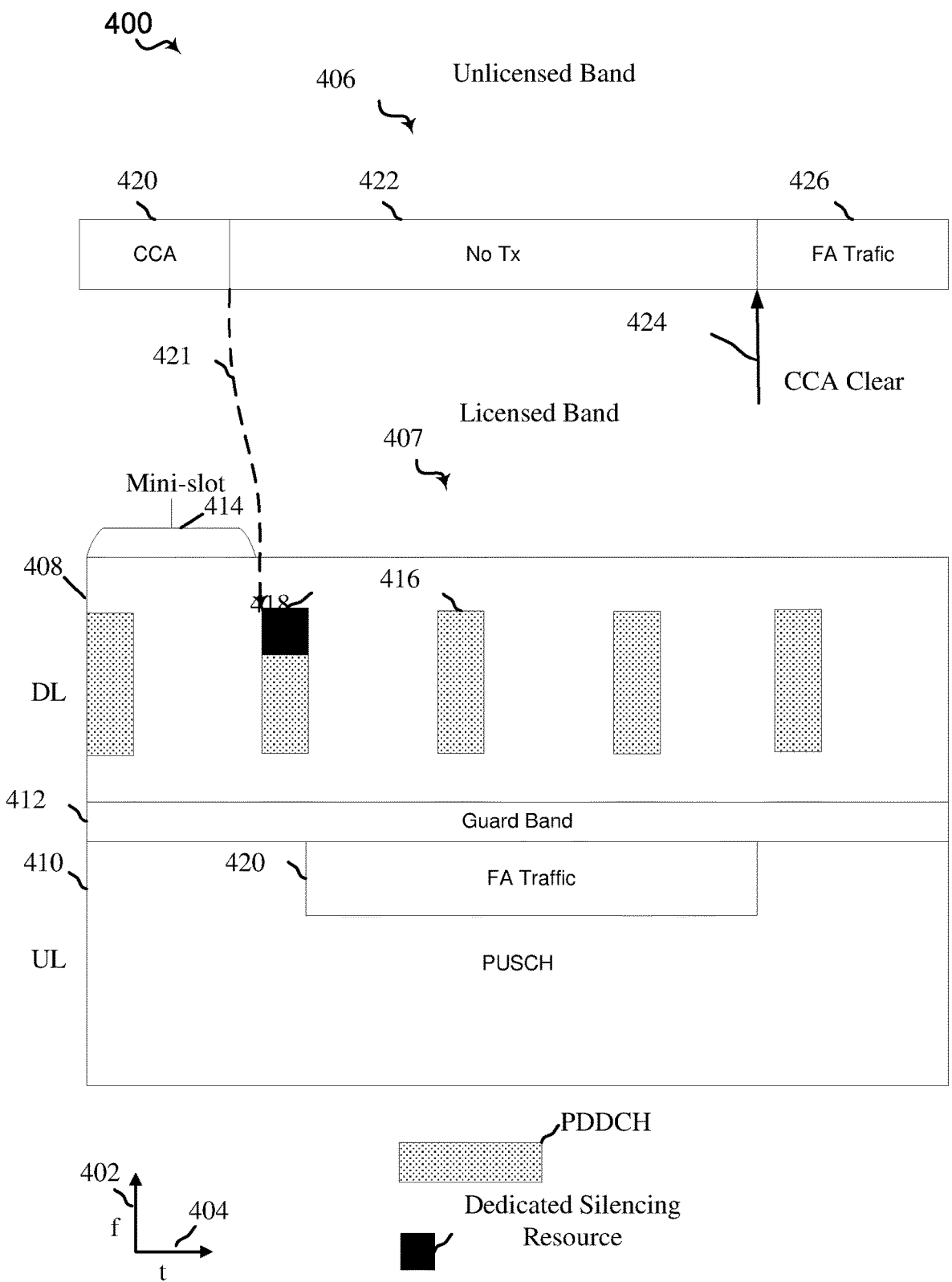
FIG. 4 illustrates an example of a timing diagram for transmitting UE data, in accordance with various aspects of the present disclosure.

Referring to FIG. 4, in accordance with various aspects of the present disclosure, an example of a timing diagram for transmitting UE data associated with a FA device 400, is shown. The timeline is shown with the vertical axis 402 representing frequency and the horizontal axis 404 representing time. An unlicensed band timeline 406 is shown as well as a licensed band timeline 407.

For the licensed band 407, downlink resources 408 and uplink resources 410 are separated in frequency by a guard band 412. The downlink resources 408 and uplink resources 410 can be temporally divided into mini-slots 414. PUSCH is available on the uplink resources 410 and PDDCH 416 is available on mini-slots 414 of the downlink resources 408. PDDCH 416 may have a dedicated silencing resource 418.

In one aspect, a UE, such as a UE associated with FA device, may need to send a URRLC message. The UE may determine that an unlicensed channel is unavailable after a failed CCA 420. The UE may then transmit a silencing signal 421 on a dedicated resource 418 in PDDCH 416. The silencing signal 421 may signal to UEs in the proximate area that they should not transmit eMBB messages on uplink resources 410 for a few mini-slots. The UE may then send FA traffic 420 directly to another UE on those newly freed-up uplink resources 410. During this time, the UE may elect to not transmit 422 on the unlicensed band. The UE may then perform a CCA 424 and assuming the CCA shows an unlicensed channel is available the UE may once again transmit again on the unlicensed band 426.

It can be appreciated that the dedicated resource may be assigned by a gNB dynamically or may be predetermined. The dedicated resource 418 may be on every mini-slot or selected mini-slots. It can also be appreciated that silencing signal 421 may be a single dedicated resource or multiple dedicated resources. The silencing signal 421 in many aspects may refer to silencing of one subsequent mini-slot. In other aspects, the silencing signal 421 may refer to silencing on many multiple mini-slots. In various aspects, the silencing signal 421, may silence all eMBB uplink resources in a subsequent mini-slots, while in other aspects only a subset of eMBB resources are silenced.

Figure 5:
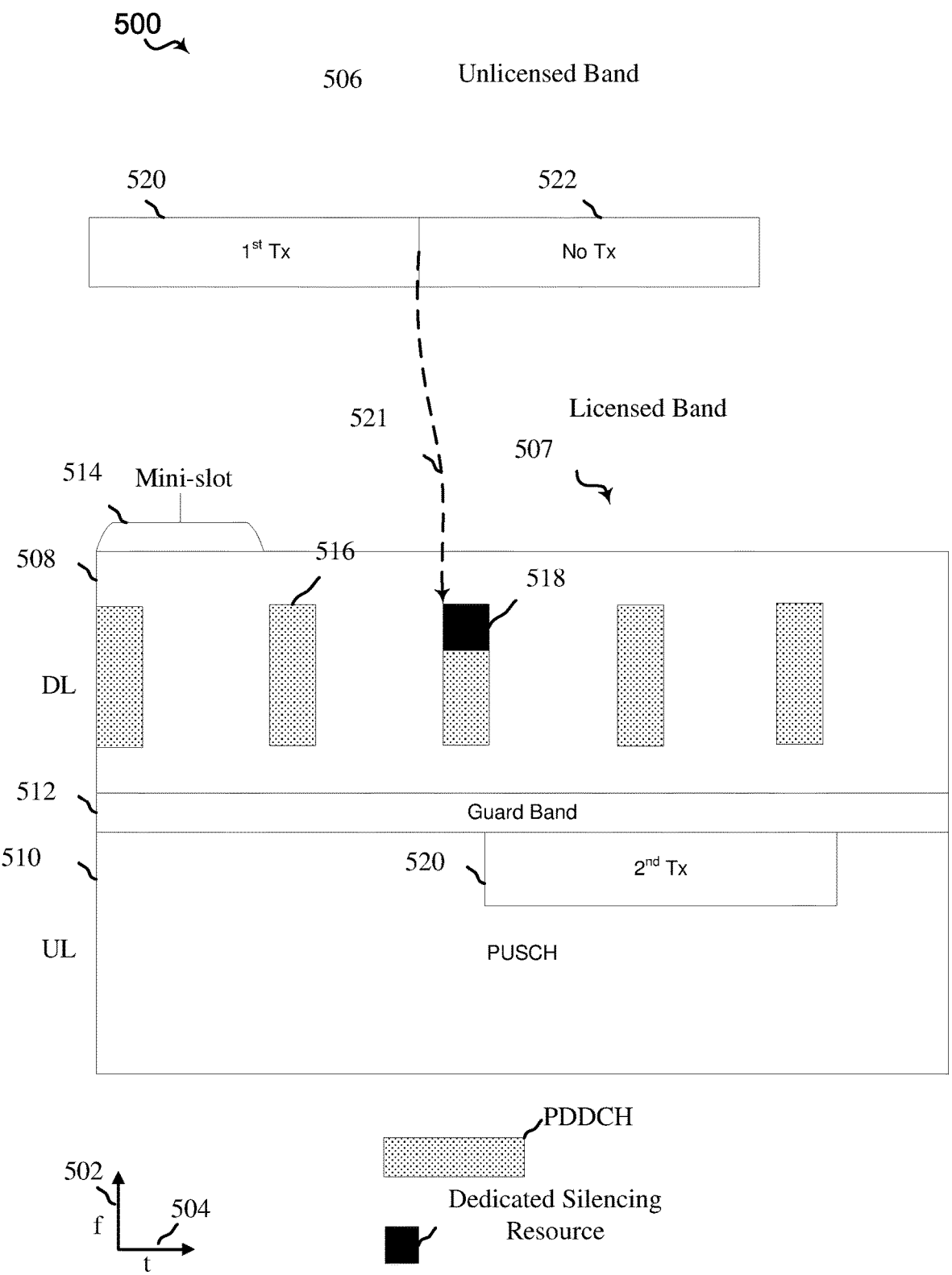
FIG. 5 illustrates a second example of a timing diagram for transmitting UE data, in accordance with various aspects of the present disclosure.

Referring to FIG. 5, in accordance with various aspects of the present disclosure, a second example of a timing diagram for transmitting UE data associated with a FA device 500, is shown. The timeline is shown with the vertical axis 502 representing frequency and the horizontal axis 504 representing time. An unlicensed band timeline 406 is shown as well as a licensed band timeline 507.

For the licensed band 507, downlink resources 508 and uplink resources 410 are separated in frequency by a guard band 512. The downlink resources 508 and uplink resources 510 can be temporally divided into mini-slots 514. PUSCH is available on the uplink resources 510 and PDDCH 516 is available on mini-slots 514 of the downlink resources 508. PDDCH 516 may have a dedicated silencing resource 518. In one aspect, a UE, such as a UE associated with FA Device, may need to send a URRLC message. The UE may determine that an unlicensed channel is unavailable after a failed transmit attempt 520. The UE may then transmit a silencing signal 521 on a dedicated resource 518 in PDDCH 516. The silencing signal 521 may signal to UEs in the proximate area that they should not transmit eMBB messages on uplink resources 510 for a few mini-slots. The UE may then send FA traffic 520 directly to another UE on those newly freed-up uplink resources 510. During this time, the UE may elect to not transmit 522 on the unlicensed band until an unlicensed channel becomes available.

It can be appreciated that the dedicated resource may be assigned by a gNB dynamically or may be predetermined. The dedicated resource 518 may be on every mini-slot or selected mini-slots. It can also be appreciated that silencing signal 521 may be a single dedicated resource or multiple dedicated resources. The silencing signal 521 in many aspects may refer to silencing of one subsequent mini-slot. In other aspects, the silencing signal 521 may refer to silencing on many multiple mini-slots. In various aspects, the silencing signal 521, may silence all eMBB uplink resources in a subsequent mini-slots, while in other aspects only a subset of eMBB resources are silenced.

Figure 6:
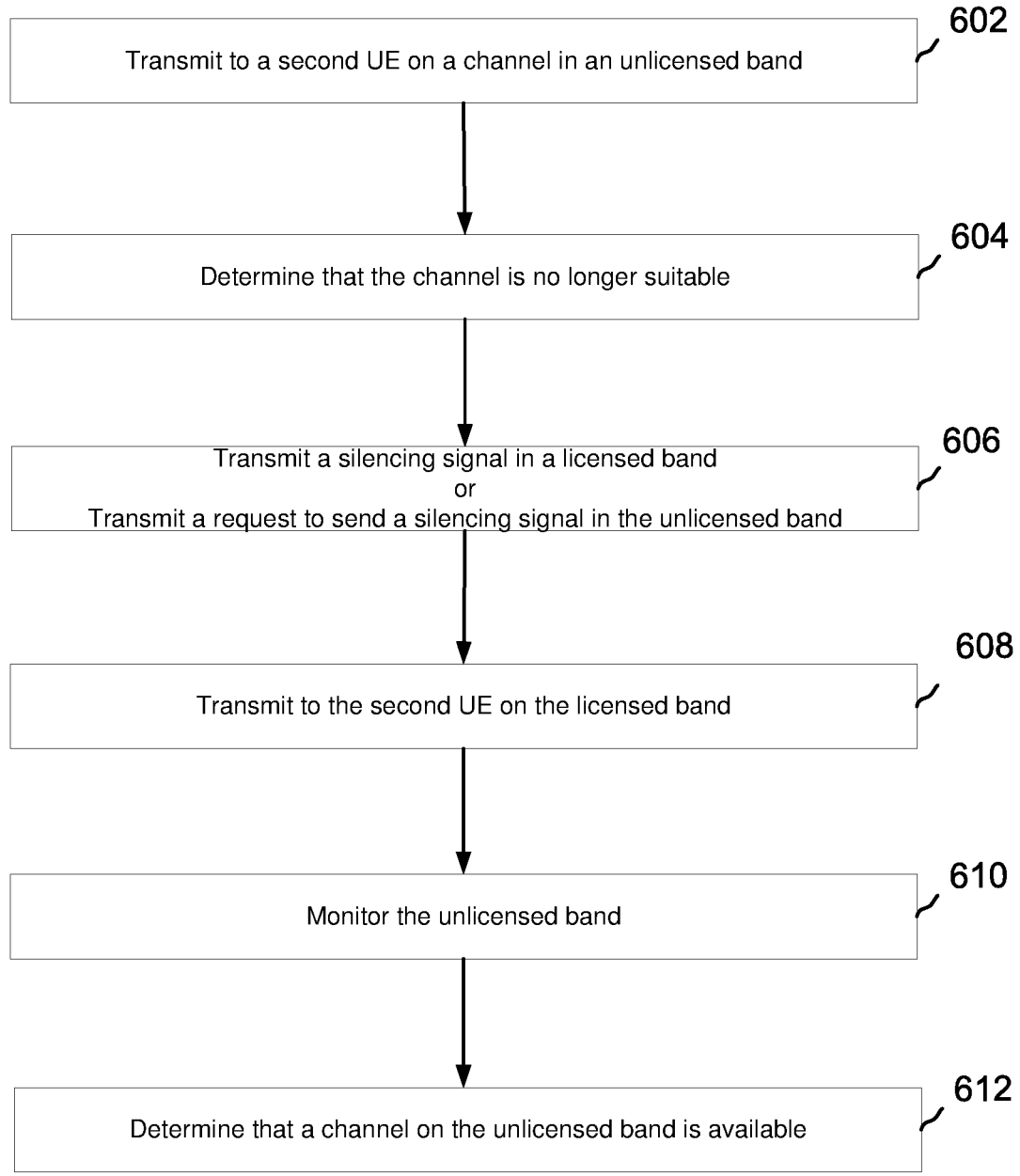
FIG. 6 illustrates an example of a flow diagram for a UE falling back to the licensed band, in accordance with various aspects of the present disclosure.

Referring to FIG. 6, in accordance with various aspects of the present disclosure, an example of a flow diagram for a UE falling back to the licensed band 600, is shown. A first UE may transmit to a second UE on a channel in an unlicensed band 602. The first UE may be associated with a controller in a factory for example. The second UE may be associated with a sensor in a factory for example.

At some point the first UE may determine that the channel on the unlicensed band is no longer suitable 604 for the required communications. This may be because of a failed CCA or a failed transmission, for example. The UE may have a need to send a URLLC message and transmission history indicates that the channel cannot support a reliability or latency requirement, for example. Channel conditions and decoding errors may also indicate that the channel is unsuitable. SINR and other channel criteria may also be indicators of channel unsuitability.

Having determined that the channel is unsuitable, the UE may transmit a silencing signal in the licensed band 606. The silencing signal may be on a dedicated downlink resource. The dedicated downlink resource may be a PDDCH resource, for example. The dedicated downlink resource may be predetermined or assigned dynamically by a gNB. In another aspect, the UE may transmit a request to send a silencing signal in the unlicensed band 606. In various aspects, the request may be similar to scheduling request. The silencing signals from the UE or the base station may be sent in a mini-slot. The silencing signal may be effectively a request for other UEs to refrain from transmitting on eMBB resources on one or more subsequent mini-slots.

The first UE may then transmit to the second UE on the licensed band 608. The transmission may be on the newly freed-up eMBB resources. The transmission may be a URLLC message, for example.

While transmitting on the licensed band the first UE may monitor the unlicensed band 610. If the unlicensed band remains unavailable or unsuitable for the desired communications, the UE may send another silencing signal or transmit another request for a silencing signal 606.

At some point, the first UE may determine that the unlicensed band is available with a suitable channel for the communications that are required. The first UE may then revert to using the less costly unlicensed band.

Figure 7:
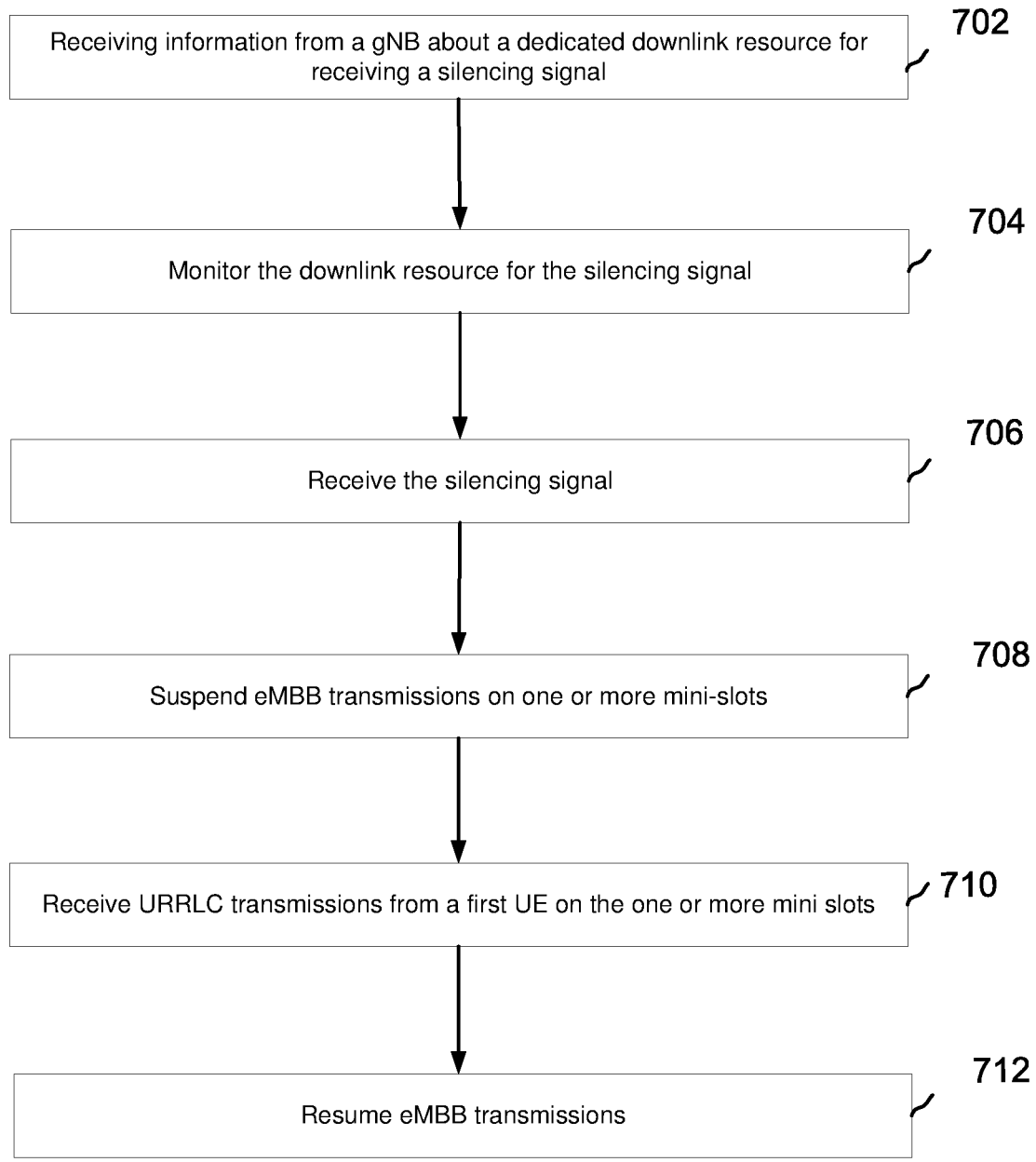
FIG. 7 illustrates an example of a flow diagram for a UE receiving a silencing signal, in accordance with various aspects of the present disclosure.

Referring to FIG. 7, in accordance with various aspects of the present disclosure an example of a flow diagram for a second UE receiving a silencing signal 700 is shown. A second UE in a gNB cell may receive information from a gNB about a dedicated downlink resource for receiving a silencing signal. The dedicated downlink resource may be on PDDCH. In various aspects, the dedicated downlink resource may be more than one resource. In other aspects, the information about the downlink resource may be predetermined. The information received from the UE may also indicated a number of mini-slots following the silencing signal for which the UE should refrain from transmitting on eMBB resources. In other aspects, the number of mini-slots is predetermined.

The UE may monitor the downlink resource for the silence signal 704. The UE may receive the silencing signal 706. The UE may then suspend eMBB transmissions on one or more mini-slots 708. In various aspects, the UE may suspend eMBB transmissions on selected eMBB resources during the one or more mini-slots. The selected resources may be predetermined or may be received from the gNB. During the suspended transmissions, the UE may receive URRLC transmissions directly from a first UE on the one or more mini-slots 710. The UE may then resume eMBB transmissions 712.

Figure 8:
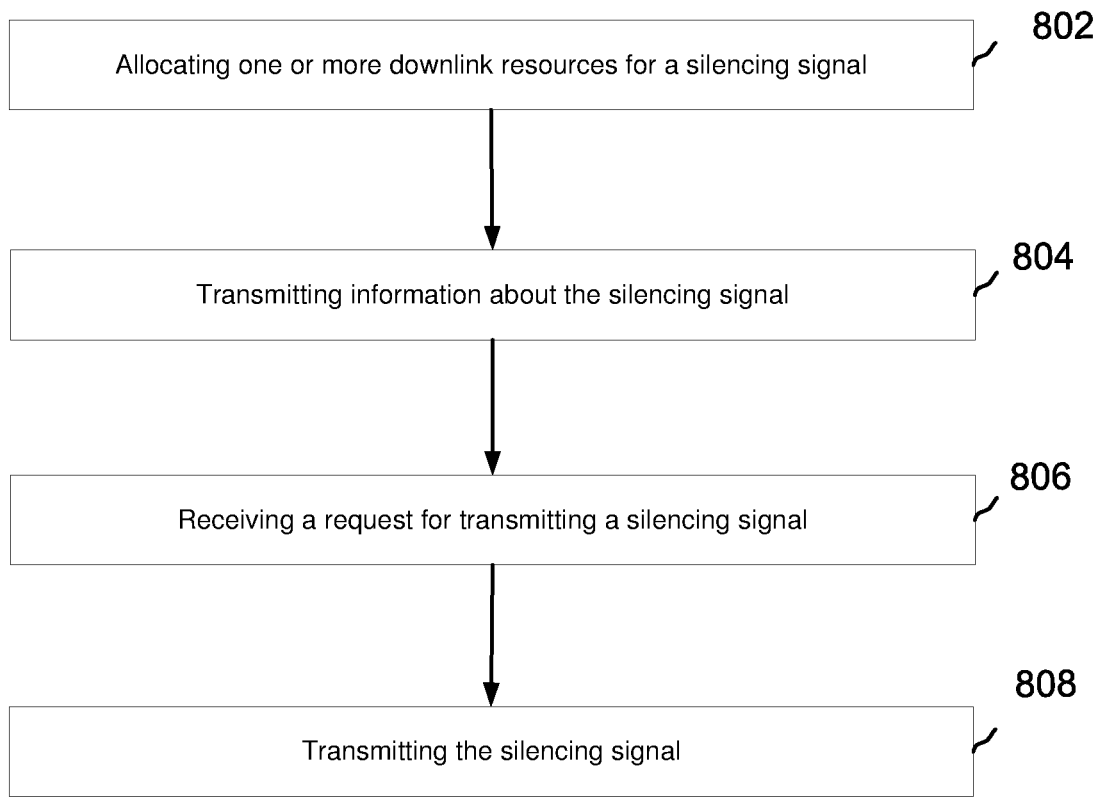
FIG. 8 illustrates an example of a flow diagram for gNB when a UE falls back to the licensed band, in accordance with various aspects of the present disclosure.

Referring to FIG. 8, in accordance with various aspects of the present disclosure an example of a flow diagram for gNB when a UE falls back to the licensed band 800, is shown 800. A gNB may allocate one or more downlink resources for a silencing signal 802. The silencing signal may be on one or more mini-slots. The silencing signal may be in PDDCH, for example. The gNB may then transmit information about the silencing signal 804. The information may include for, for example, the resources on which the silencing signal should be sent, the number of mini-slots for which a UE receiving the silencing signal should suspend eMBB transmission, specific resources for which eMBB transmissions should be suspended and other pertinent silencing information. In some aspects information about the silencing signal is predetermined and the gNB need not transmit the information.

The gNB may receive a request for transmitting a silencing signal 806. The request may be similar to a scheduling request. The gNB may then transmit the silencing signal 808. The silencing signal may be on PDDCH for example.

Figure 9:
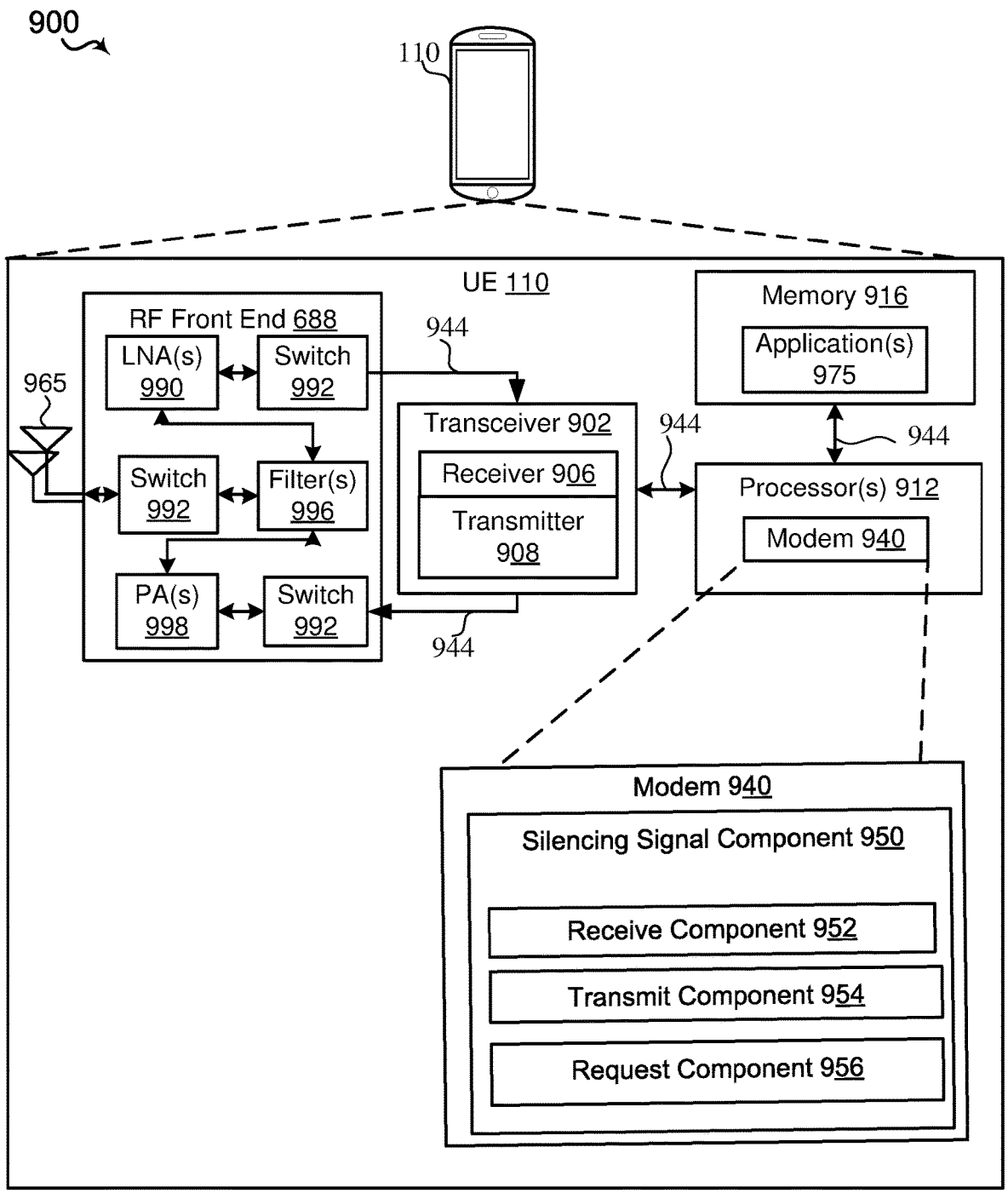
FIG. 9 illustrates an example of an implementation of a UE in accordance with various aspects of the present disclosure.

Referring to FIG. 9, in accordance with various aspects of the present disclosure an example of an implementation of UE 910 is shown 900. It may include a variety of components, some of which have already been described above, but including components such as one or more processors 912 and memory 916 and transceiver 902 in communication via one or more buses 944, which may operate in conjunction with modem 940 and silencing signal component 950 to enable one or more of the functions described herein related to processing a silencing signal or silencing signal request. Further, the one or more processors 912, modem 940, memory 916, transceiver 902, RF front end 988 and one or more antennas 965, may be configured to support voice and/or data calls (simultaneously or non-simultaneously) in one or more radio access technologies.

In an aspect, the one or more processors 912 can include a modem 940 that uses one or more modem processors. The various functions related to a silencing component 950 may be included in modem 940 and/or processors 912 and, in an aspect, can be executed by a single processor, while in other aspects, different ones of the functions may be executed by a combination of two or more different processors. For example, in an aspect, the one or more processors 912 may include any one or any combination of a modem processor, or a baseband processor, or a digital signal processor, or a transmit processor, or a receiver processor, or a transceiver processor associated with transceiver 902. In other aspects, some of the features of the one or more processors 912 and/or modem 940 associated with silencing signal component 950 may be performed by transceiver 902.

Also, memory 916 may be configured to store data used herein and/or local versions of applications 975 or silencing signal component 950 and/or one or more of its subcomponents being executed by at least one processor 912. Memory 916 can include any type of computer-readable medium usable by a computer or at least one processor 912, such as random-access memory (RAM), read only memory (ROM), tapes, magnetic discs, optical discs, volatile memory, non-volatile memory, and any combination thereof. In an aspect, for example, memory 916 may be a non-transitory computer-readable storage medium that stores one or more computer-executable codes defining silencing signal component 950 and/or one or more of its subcomponents, and/or data associated therewith, when UE 110 is operating at least one processor 912 to execute indication component 150 and/or one or more of its subcomponents.

Transceiver 902 may include at least one receiver 906 and at least one transmitter 908. Receiver 906 may include hardware, firmware, and/or software code executable by a processor for receiving data, the code comprising instructions and being stored in a memory (e.g., computer-readable medium). Receiver 906 may be, for example, a radio frequency (RF) receiver. In an aspect, receiver 906 may receive signals transmitted by at least one base station 105. Additionally, receiver 906 may process such received signals, and also may obtain measurements of the signals, such as, but not limited to, Ec/Io, SNR, RSRP, RSSI, etc. Transmitter 908 may include hardware, firmware, and/or software code executable by a processor for transmitting data, the code comprising instructions and being stored in a memory (e.g., computer-readable medium). A suitable example of transmitter 908 may including, but is not limited to, an RF transmitter.

Moreover, in an aspect, UE 110 may include RF front end 988, which may operate in communication with one or more antennas 965 and transceiver 902 for receiving and transmitting radio transmissions, for example, wireless communications transmitted by at least one base station 105 or wireless transmissions transmitted by UE 110. RF front end 988 may be connected to one or more antennas 965 and can include one or more low-noise amplifiers (LNAs) 990, one or more switches 992, one or more power amplifiers (PAs) 998, and one or more filters 996 for transmitting and receiving RF signals.

In an aspect, LNA 990 can amplify a received signal at a desired output level. In an aspect, each LNA 990 may have a specified minimum and maximum gain values. In an aspect, RF front end 988 may use one or more switches 992 to select a particular LNA 990 and its specified gain value based on a desired gain value for a particular application.

Further, for example, one or more PA(s) 998 may be used by RF front end 988 to amplify a signal for an RF output at a desired output power level. In an aspect, each PA 698 may have specified minimum and maximum gain values. In an aspect, RF front end 688 may use one or more switches 992 to select a particular PA 998 and its specified gain value based on a desired gain value for a particular application.

Also, for example, one or more filters 996 can be used by RF front end 988 to filter a received signal to obtain an input RF signal. Similarly, in an aspect, for example, a respective filter 996 can be used to filter an output from a respective PA 998 to produce an output signal for transmission. In an aspect, each filter 996 can be connected to a specific LNA 990 and/or PA 998. In an aspect, RF front end 988 can use one or more switches 992 to select a transmit or receive path using a specified filter 696, LNA 690, and/or PA 998, based on a configuration as specified by transceiver 902 and/or processor 912.

As such, transceiver 902 may be configured to transmit and receive wireless signals through one or more antennas 965 via RF front end 988. In an aspect, transceiver may be tuned to operate at specified frequencies such that UE 110 can communicate with, for example, one or more base stations 105 or one or more cells associated with one or more base stations 105. In an aspect, for example, modem 940 can configure transceiver 902 to operate at a specified frequency and power level based on the UE configuration of the UE 110 and the communication protocol used by modem 940.

In an aspect, modem 940 can be a multiband-multimode modem, which can process digital data and communicate with transceiver 902 such that the digital data is sent and received using transceiver 902. In an aspect, modem 940 can be multiband and be configured to support multiple frequency bands for a specific communications protocol. In an aspect, modem 940 can be multimode and be configured to support multiple operating networks and communications protocols. In an aspect, modem 940 can control one or more components of UE 110 (e.g., RF front end 988, transceiver 902) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 10:
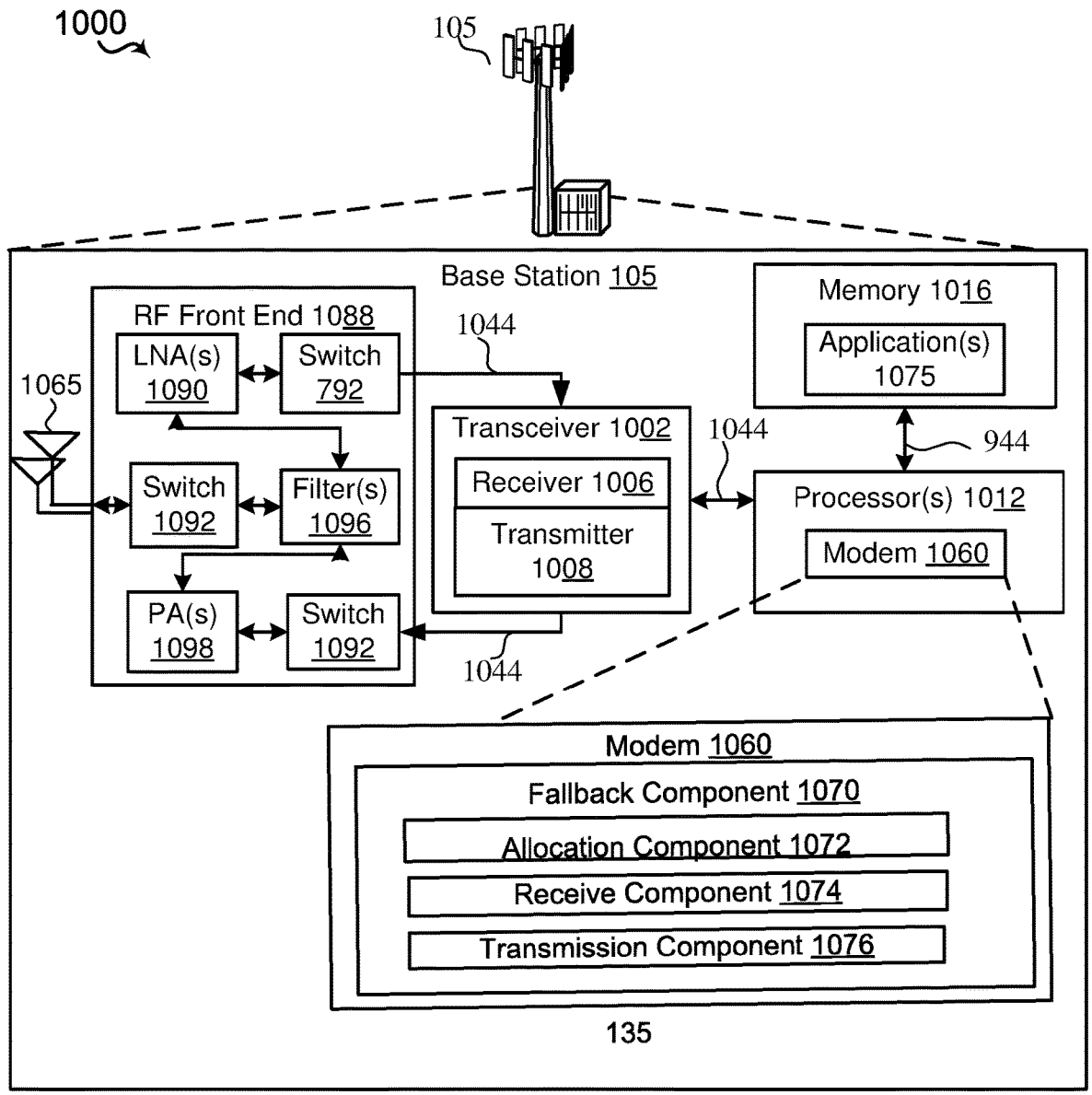
FIG. 10 illustrates an example of an implementation of a gNB in accordance with various aspects of the present disclosure.

Referring to FIG. 10, in accordance with various aspects of the present disclosure an example of an implementation of base station 105 may include a variety of components, some of which have already been described above, but including components such as one or more processors 1012 and memory 1016 and transceiver 1002 in communication via one or more buses 1044, which may operate in conjunction with modem 1060 and fallback component 1070 to enable one or more of the functions described herein related to transmitting an indication channel that indicates whether a current mini-slot includes an URLLC transmission.

The transceiver 1002, receiver 1006, transmitter 1008, one or more processors 1012, memory 1016, applications 1075, buses 1044, RF front end 1088, LNAs 1090, switches 1092, filters 1096, PAs 1098, and one or more antennas 1065 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of operating a User Equipment (UE) comprising:
    transmitting to a second UE on a channel in an unlicensed band;
    determining that the channel in the unlicensed band is not suitable for an Ultra-Reliable Low-Latency Communication (URLLC);
    transmitting a silencing signal on at least one gNB downlink resource in a licensed band; and
    transmitting a URLLC message to the second UE on the licensed band.

2. The method of claim 1 wherein the silencing signal is a request to cease eMBB uplink transmissions on one or more subsequent mini-slots.

3. The method of claim 1 wherein the silencing signal includes information about a duration or one or more frequency resources for which eMBB uplink transmissions should cease.

4. The method of claim 1 further comprising monitoring the channel on the unlicensed band to determine when the channel becomes available and retransmitting on the channel in the unlicensed band.

5. The method of claim 1 further comprising receiving information from a gNB about a dedicated downlink resource for transmitting the silencing signal.

6. The method of claim 5 wherein the dedicated downlink resource is a URLLC/eMBB multiplexing channel.

7. A User Equipment (UE) comprising:
    a transmitter configured to transmit to a second UE on a channel in an unlicensed band;
    a processor configured to determine that the channel in the unlicensed band is not suitable for an Ultra-Reliable Low-Latency Communication (URLLC); and the transmitter further configured to:
- transmit a silencing signal on at least one gNB downlink resource in a licensed band; and
- transmit a URLLC message to the second UE on the licensed band.

8. The UE of claim 7 wherein the silencing signal is a request to cease eMBB uplink transmissions on one or more subsequent mini-slots.

9. The UE of claim 7 wherein the silencing signal includes information about a duration or one or more frequency resources for which eMBB uplink transmissions should cease.

10. The UE of claim 7 wherein the processor is further configured to monitor the channel on the unlicensed band to determine when the channel becomes available and the transmitter is further configured to retransmit on the channel in the unlicensed band.

11. The UE of claim 7 further comprising a receiver configured to receive information from a gNB about a dedicated downlink resource for transmitting the silencing signal.

12. The UE of claim 11 wherein the dedicated downlink resource is on a URLLC/eMBB multiplexing channel.

13. A User Equipment (UE) comprising:
- means for transmitting to a second UE on a channel in an unlicensed band;
- means determining that the channel in the unlicensed band is not suitable for an Ultra-Reliable Low-Latency Communication (URLLC); and
- means for:
  - transmitting a silencing signal on at least one gNB downlink resource in a licensed band; and
  - transmitting a URLLC message to the second UE on the licensed band.

14. The UE of claim 13 wherein the silencing signal is a request to cease eMBB uplink transmissions on one or more subsequent mini-slots.

15. The UE of claim 13 wherein the silencing signal includes information about a duration or one or more frequency resources for which eMBB uplink transmissions should cease.

16. The UE of claim 13 further comprising means to monitor the channel on the unlicensed band to determine when the channel becomes available and the transmitter is further configured to retransmit on the channel in the unlicensed band.

17. The UE of claim 13 further comprising means for receiving information from a gNB about a dedicated downlink resource for transmitting the silencing signal.

18. The UE of claim 17 wherein the dedicated downlink resource is on a URLLC/eMBB multiplexing channel.

19. A non-transitory computer readable medium having code for causing a processor of a User Equipment to:
- transmit to a second UE on a channel in an unlicensed band;
- determine that the channel in the unlicensed band is not suitable for an Ultra-Reliable Low-Latency Communication (URLLC);
- transmit a silencing signal on at least one gNB downlink resource in a licensed band; and
- transmit a URLLC message to the second UE on the licensed band.

20. The non-transitory computer readable medium of claim 19 wherein the silencing signal is a request to cease eMBB uplink transmissions on one or more subsequent mini-slots.

21. The non-transitory computer readable medium of claim 19 wherein the silencing signal includes information about a duration or one or more frequency resources for which eMBB uplink transmissions should cease.

22. The non-transitory computer readable medium of claim 19 further comprising code to monitor the channel on the unlicensed band to determine when the channel becomes available and the transmitter is further configured to retransmit on the channel in the unlicensed band.

23. The non-transitory computer readable medium of claim 19 further comprising code for receiving information from a gNB about a dedicated downlink resource for transmitting the silencing signal.

24. The non-transitory computer readable medium of claim 23 wherein the dedicated downlink resource is on a URLLC/eMBB multiplexing channel.

* * * * *